United States Patent [19]

Church

[11] 4,204,686
[45] May 27, 1980

[54] PHONOGRAPH RECORD PROTECTIVE CUSHION

[76] Inventor: Walter E. Church, 1108 Longmont Ave., Boise, Id. 83706

[21] Appl. No.: 875,247

[22] Filed: Feb. 6, 1978

[51] Int. Cl.² .............................................. G11B 23/00
[52] U.S. Cl. .................................................... 274/1 R
[58] Field of Search ..................... 274/1 R, 42 R, 42 P

[56] References Cited

U.S. PATENT DOCUMENTS

| | | | |
|---|---|---|---|
| 1,732,747 | 10/1929 | Germain | 274/42 R |
| 2,906,536 | 9/1959 | Mauerhoff | 274/42 R |
| 3,540,737 | 11/1970 | Borthwick | 274/1 R |
| 4,061,341 | 12/1977 | Kaplan | 274/1 R |

Primary Examiner—Steven L. Stephan
Attorney, Agent, or Firm—Paul F. Horton

[57] ABSTRACT

A phonograph protective cushion for insertion between records stacked upon a spindle for protecting the records against abrasion damage and impact damage while allowing substantial unobstructed view of the recording label. The protective cushion includes a planar ring connected on internal opposing edges by a cross rib. Opposing sides of the ring and rib are covered by cushioning material. The rib defines a spindle receiving opening at the ring axis and also bisects the ring to define a pair of substantially semicircular apertures for viewing the recording labels. The cushion may contain a multiplicity of flexible bristles, inwardly and radially extending from the edges of the spindle receiving opening for unobstructed movement along the spindle during record changes and for centering of the cushion on the record dropped. The cushion may also contain additional supporting ribs.

1 Claim, 6 Drawing Figures

PHONOGRAPH RECORD PROTECTIVE CUSHION

BACKGROUND OF THE INVENTION

1. Field of the Invention

The present invention relates to protective phonograph record cushions and, in particular, to record cushions insertable between records stacked upon a spindle for record changing.

2. Description of the Prior Art

The advantages associated with record changing by means of a dropping spindle have long been recognized. A primary disadvantage of this record changing process, especially to connoisseurs in the art of audio fidelity, is the audio distortion caused by abrasions and scratches upon the records due to contact between playing surfaces of the records as they are stacked and dropped into the playing position.

To overcome this disadvantage, several devices have been invented as typified by U.S. Pat. No. 2,906,536 issued in 1959 to G. H. M Mauerhoff and, more recently, U.S. Pat. No. 3,540,737 issued in 1970 to T. H. Borthwick. Such devices, generally, comprise solid discs having a cushioning surface on either one or both sides and a spindle receiving opening orifice at the vertical axis of the disc. The discs may be made of either transparent or opaque material. Where opaque, a reading of the recording label lying beneath the disc is impossible. Where transparent, a reading of the label is often difficult, if not impossible, because of factors including distortion by the transparent medium, scratches upon the surface of the medium, light reflection, and accumulations of dust or other debris upon the medium. In addition, such discs, because of their lightness of weight, may catch upon the spindle or drop upon the record in an off-center position, thereby producing sound distortion because of the wobble of the overlying record.

SUMMARY OF THE INVENTION

The present invention comprises a phonograph record protective cushion having a cushioned ring and at least one centrally located rib extending between oppositely disposed internal edges of the ring thereby defining at least two voids for viewing an underlying label. The cushion, of the present invention, may also include a central spindle receiving opening which includes a multiplicity of radially, inwardly, extending flexible projections for contacting the spindle.

It is therefore an object of the present invention to provide a phonograph record cushion having a plurality of apertures defined by the ribs and the ring for convenient and unobstructed view of an underlying record.

It is also a primary object of the present invention to provide a phonograph record cushion having a central spindle receiving opening surrounded by flexible bristles to prevent hang-up of the cushion when dropped during the record changing process.

A further object of the present invention is to provide a phonograph record cushion having cushioning material on opposing planar surfaces and having at least one aperture for convenient and unobstructed view of an underlying record label.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 2:
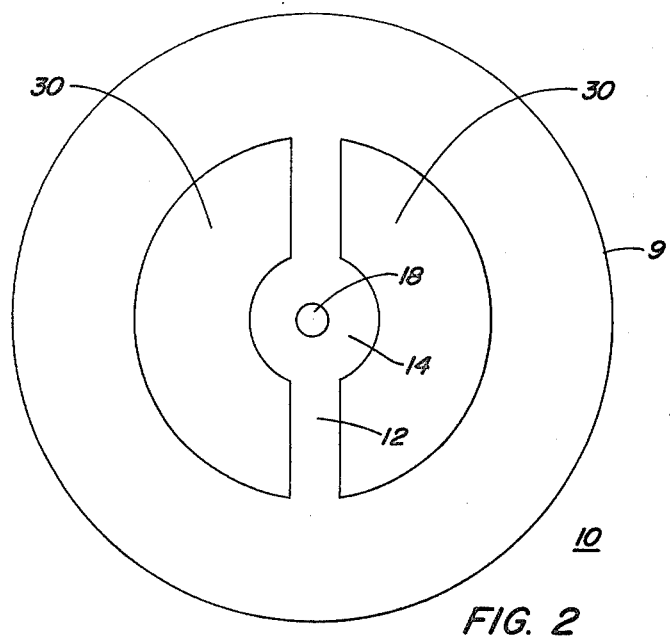
FIG. 2 is a plan view of one of the embodiments of the record cushion of the present invention.

Referring now to the drawings and, more specifically, FIG. 2, one embodiment of phonograph record protective cushion 10 is shown. Cushion 10 includes a substantially planar, annular ring 9; a rib 12 attached to and preferably integral with ring 9 and extending between interior opposing sidewalls of the ring; and cushioning material 19 laminated or otherwise attached to opposing planar surfaces of the ring and rib, as may be seen to better advantage in FIGS. 4 and 6.

Figure 3:
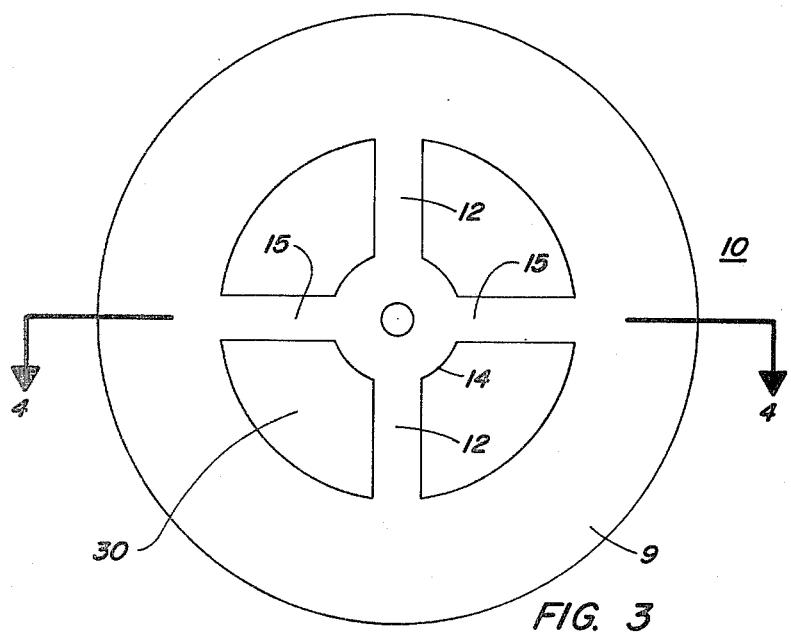
FIG. 3 is a plan view of an alternate embodiment of the present invention.

Ring 9 has an outside diameter of approximately 10 cm. and an internal diameter of approximately 7 cm. Ring 9 is preferably fabricated of thin plastic sheet stock having a thickness of approximately 1 mm. or less. Rib 12 is preferably fabricated from the same sheet stock as ring 9 and integral therewith. The rib defines, at its midpoint and the axial midpoint of ring 9, spindle receiving opening 18 for insertion of cushion 10 upon spindle 20, as may be seen in FIG. 1, to prevent abrasion between records 40 during the stacking of the records and during the dropping of the records upon one another during the record changing process. Rib 12 is approximately 1 cm. in width, having an expanded annular flange portion 14 adjacent its midpoint and surrounding the spindle receiving opening 18 as shown in the figures. Spindle receiving aperture 18, in one embodiment, is 12 mm. in diameter, thereby having a diameter of approximately 5 mm. greater than the standard phonograph record orifice. The larger diameter tends to prevent hang-up of cushion 10 on spindle 20 as it drops during record change. It will be noted that rib 12 bisects the ring to define a pair of substantially semicircular apertures 30 on either side of the rib. Apertures 30 permit a clear and unobstructed view of the recording label which underlies cushion 10. Should more rib support be desired, a second rib 15 extending at right angles to rib 12 may be employed, as may be seen in FIGS. 3 and 4.

Figure 5:
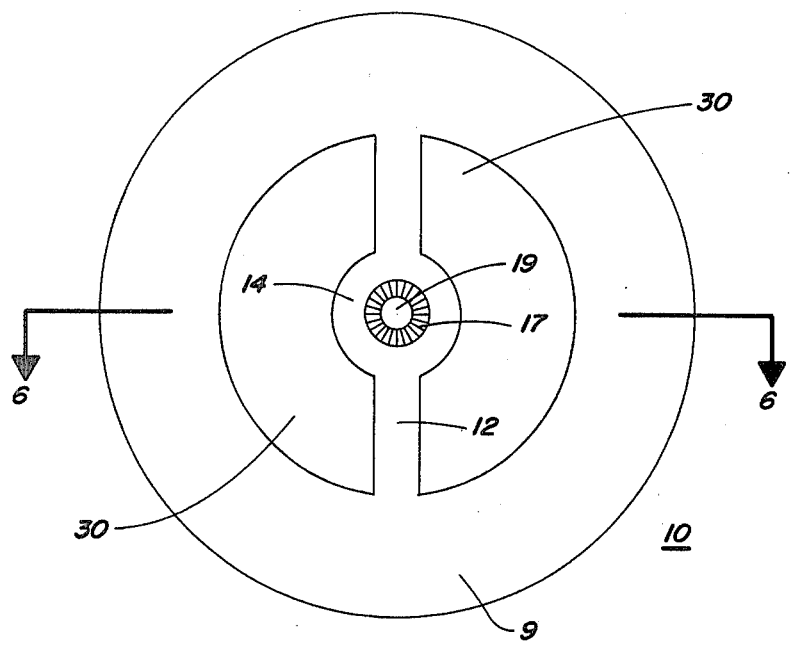
FIG. 5 is a plan view of the present invention showing an embodiment having a multiplicity of radially extending bristles about the spindle receiving opening.
Figure 6:
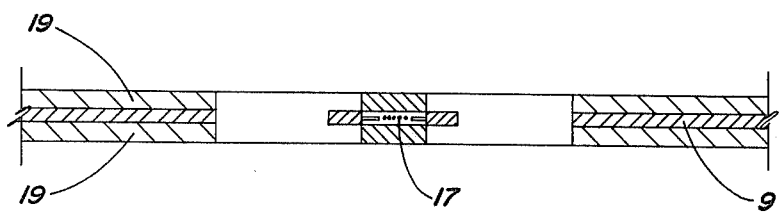
FIG. 6 is an elevated sectional view along lines 6—6 of FIG. 5.

Referring now to FIG. 5, another embodiment to be preferred of cushion 10 is disclosed. This embodiment, as illustrated by FIG. 5 and in cross-section in FIG. 6 is quite similar to the embodiment described in FIG. 2, differing only in one respect. This difference is in the construction of the spindle receiving opening where a multiplicity of horizontal, radially extending, flexible projections 17, lying planar with the ring and the rib, project inwardly from the side walls of opening 18, which, in this embodiment may be of the same dimensions or larger in diameter than as aforesaid. Projections 17 are hairlike or brushlike in construction and may be fabricated of the same plastic material as ring 9 and ribs 12 and 15, and may therefore be integral therewith, being simply a filamentous extension of the sidewalls of opening 18 to define a second and smaller spindle receiving opening 19. Alternatively, projections 17 may be fabricated from nylon filaments or animal hair as are conventionally found in painting brushes, or may be made of any other suitable material. Such filaments or hair may be embedded in the sidewalls of opening 18 or secured to the sidewalls in other conventional manner. When projections 17 are used in conjunction with the device, opening 19 will be approximately 7-9 mm. in diameter, thereby approximating the orifice of the standard record and of spindle 20. It is to be noted that the short bristles 17, being flexible in nature, allow for easy slippage of cushion 10 about spindle 20 thereby preventing a hang-up of the cushion during the drop toward the turntable during record changes. It is further to be noted that bristles 17 provide for accurate self-centering of cushion 10 about spindle 20, thereby providing a centered cushion for receiving an overlying record to prevent wobbling of the record with the concomitant audio distortion.

Figure 4:
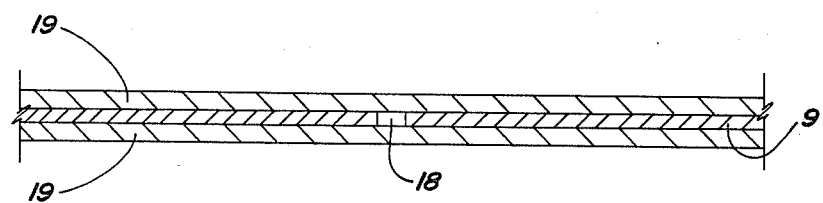
FIG. 4 is an elevated sectional view along lines 4—4 of FIG. 3.

Protective cushioning 19, shown to advantage in FIGS. 4 and 6, may be fabricated of foam rubber, felt cloth, polyurethane, or any other suitable cushioning material capable of offering a soft and unabrasive contact between the surfaces of stacked records. Cushioning material 19 covers the entire opposing surfaces of ring 9 and opposing surfaces of ribs 12 and 15 either up to the annular flange 14 or, if desired, may cover flange 14 itself adjacent the spindle receiving opening 18.

Figure 1:
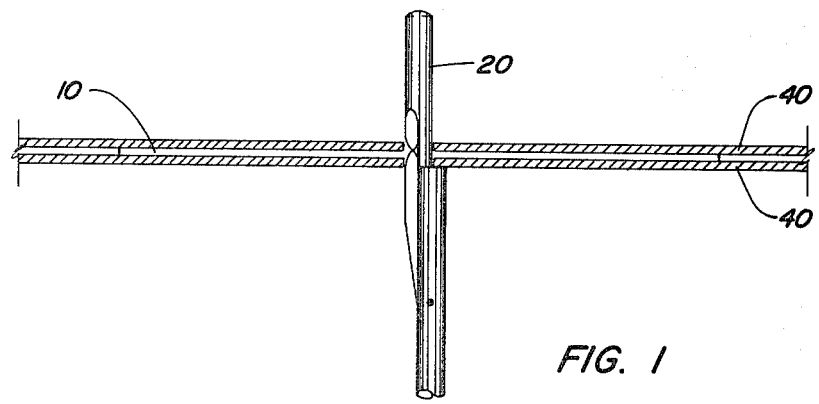
FIG. 1 is a side elevation, in partial section, of a record changer showing the record cushion of the present invention inserted between records.

In use, cushions 10 are alternately disposed between records 40, as shown in FIG. 1, with the spindle receiving opening encircling spindle 20. The soft cushioning material 19 is thereby in direct contact with the record surfaces for preventing abrasive contact of the records against one another. As a record drops, during the record changing process, cushion 10 drops in place in an overlying position over the top record on the turntable. Cushion 10, where used without flexible projections 17, has a spindle receiving opening quite larger than the diameter of the spindle. This larger opening is depended upon the provide an unobstructed drop along the length of spindle 20 to the surface of the record. Where the embodiment incorporating projections 17 is used, it will be seen that the flexible bristles bend upwardly during the drop, thereby preventing direct contact between the edges of aperture 18 and the spindle. This provides smooth slippage along the length of the spindle. It will also be seen that cushion 10 tends to center itself about the spindle as it drops to the record below. Audio distortion because of an off-centered cushion is thereby prevented.

Having thus described in detail a preferred selection of embodiments of the present invention, it is to be appreciated and will be apparent to those skilled in the art that many physical changes could be made in the device without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A protective cushion for label bearing phonograph records comprising:
    a substantially planar annular ring having at least one rib extending between opposing internal edges of said ring defining a plurality of apertures for substantially unobstructed viewing of the labels, one of said ribs having a spindle receiving opening centrally located therein;
    a multiplicity of flexible filamentous projections, horizontally disposed and radially and inwardly projecting from the edges of the spindle receiving opening, said projections defining a second spindle opening; and
    cushioning material secured to opposing sides of said ring and said rib.

* * * * *